INVENTORS.
NORMAN G. WEITZMAN
BERRY S. WEITZMAN

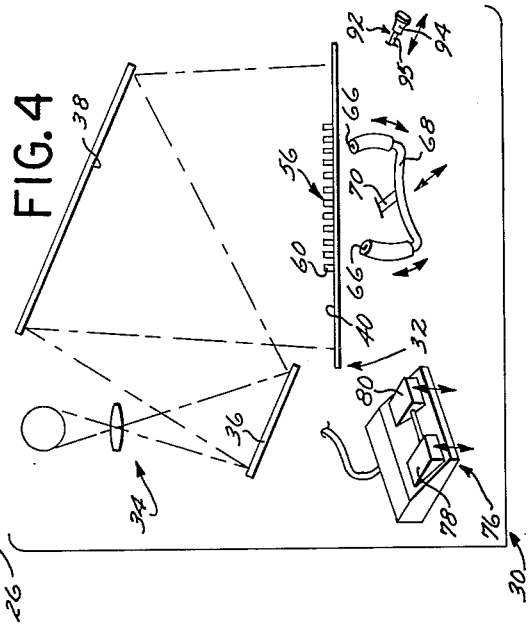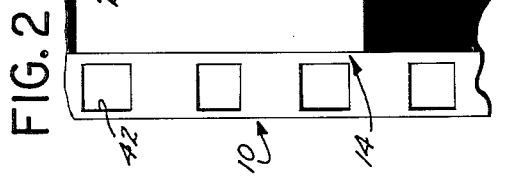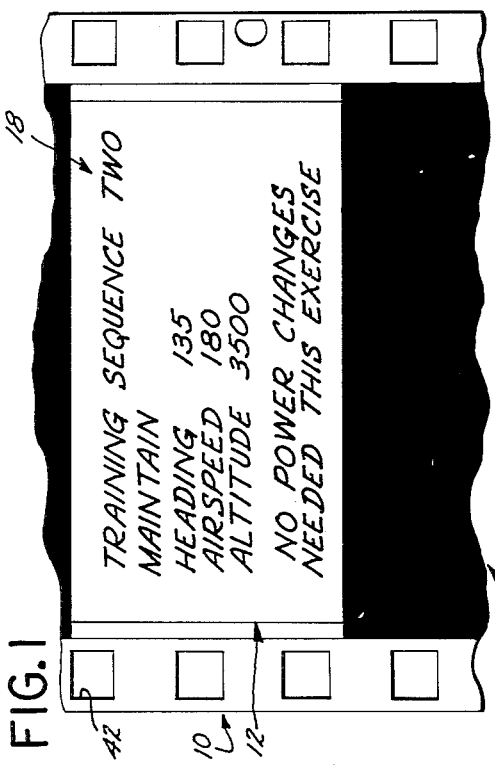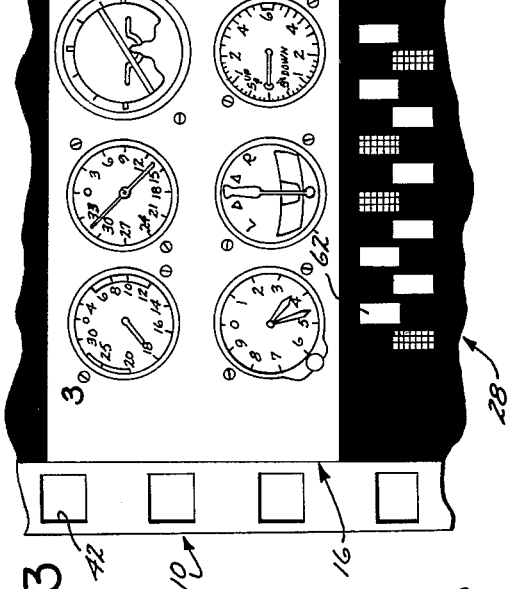

United States Patent Office 3,471,942
Patented Oct. 14, 1969

3,471,942
PROBLEM AND CORRELATED RESPONSE PRESENTATION ARTICLE OF MANUFACTURE
Norman G. Weitzman and Barry S. Weitzman, both %
Arnold J. Provisor, P.O. Box 926, Sepulveda, Calif.
92352
Filed June 2, 1965, Ser. No. 460,688
Int. Cl. G09b 9/08
U.S. Cl. 35—9                                    3 Claims

ABSTRACT OF THE DISCLOSURE

A teaching machine presents a problem on a film strip to a student, who responds by manipulating one or more of a plurality of response elements, only a correct response advancing the film strip to a further problem. A novel correct answer code configuration is provided along the film frame edge which is non-visible to the student and is sensed by photosensitive means.

Figure 5:
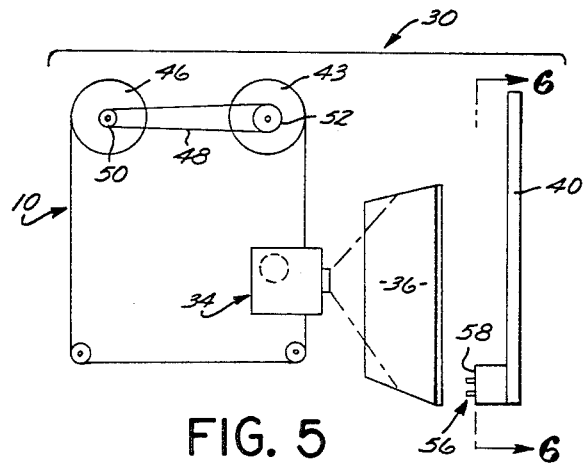

Generally speaking, the present invention relates to the teaching machine and/or motor response training apparatus arts and, more particularly, pertains to a novel article of manufacture adapted for cooperation with such a teaching machine and/or motor response training apparatus, whereby to together function and operate in a manner adapted to very quickly and thoroughly teach a student or trainee various different types of desired information and, in particular, motor response training, such as pilot training or the like, wherein the student is quickly taught the correct motor response actions for a variety of different situations which may be encountered during the flight of an airplane. In this connection, it should be noted that one exemplary form of such a pilot training motor response apparatus and/or teaching machine particularly well adapted for cooperation with the novel article of manufacture of the present invention, is more particularly disclosed and claimed in our copending patent application, Ser. No. 460,167, filed June 1, 1965, and entitled A Teaching Machine and Motor Training Apparatus, now U.S. Patent No. 3,310,884. However, it should be clearly understood that the novel article of manufacture of the present invention is not limited entirely to use in said particular motor response training apparatus and/or teaching machine disclosed in our said copending application, but may be employed in a variety of other types of projectors, devices, and/or machines for teaching purposes and/or motor response training purposes of a great variety of types including various types of motor response training and, more broadly speaking, for teaching virtually any desired type of information whether of a motor response training type or not.

The novel article of manufacture of the present invention comprises projection panel frame means adapted for optical projection so as to be viewed by a student or trainee, with said projection frame means taking the form of one or more effective slides, transparencies or other projectable originals, capable of such projection and each having a visibly perceptible problem presentation portion which, when projected so that the student may view same, will visibly present a problem to the student for solution, and each also having a correlated answer and response presentation portion adapted to be prevented from projection with respect to the student in a manner such that the student may view and understand same and, instead, adapted to be received by corresponding photosensitive means correlated with control means to be operated by the student for the purpose of indicating his selected responsive action or solution to the problem presented to the student by the projection frame means so that a correct response or solution by the student will be sensed, by way of the correlation between the photosensitive means and the operated control means, and will correspondingly represent a correct solution by the student and bring about an appropriate action recognizable to the student as a confirmation of his correct solution of the problem which has been visibly presented to the student.

On the other hand, such a positioning of the correlated answer and response presentation portion of each projection frame means and the corresponding positioning of the photosensitive means adapted to effective receive same, and the correlation of said photosensitive means with respect to the control means adapted to be operated by the student, are such that an incorrect response or solution by the student or trainee will be sensed and will cause an appropriate action which the student will recognize as an indication of an error in his solution or responsive action.

As pointed out above, one such teaching machine and/or motor response training apparatus is disclosed in our copending application identified above, and reference is made thereto for a detailed understanding of such an apparatus and machine adapted for cooperation with the novel article of manufacture of the present invention, comprising the projection frame means as referred to above, which may include one or more such projection frame means, each having both the problem presentation portion and the correlated answer and response presentation portion referred to above, and which, in one preferred form, comprises a plurality of light and dark regions, each of which is capable of varying in two different ways—that is, being either light or dark and, thus, effectively comprises an answer code of an effectively binary type with respect to each possible responsive answer comprising the positioning of one or more controls by the student or trainee.

It should be noted that, in a preferred form of the present invention, the problem presentation portion comprises an upper portion of each projection frame means. and the correlated answer and response presentation portion comprises a lower portion thereof having a plurality of light and dark projection answer code portions or regions, which, in one preferred form, are each of rectangular form.

With the above points in mind, it is an object of the present invention to provide a novel projection panel frame means including a problem presentation portion and a correlated answer and response presentation portion and arranged in a manner such as to facilitate displaying the problem presentation portion to a student while not displaying the correlated answer and response presentation portion to the student but, instead, causing same to be received by a correlated answer or response mechanism comprising photosensitive means for reception of the information carried by correlated answer and response presentation portion and control means to be operated by a student to indicate his attempt to answer or solve the problem visibly presented to him.

It is a further object of the present invention to provide a novel article of manufacture of the character referred to herein, having, the advantages referred to herein and including the features referred to herein, generically and/or specifically, and individually or in combination, and which is of an extremely simple, inexpensive, easy-to-use construction and nature, and which can be produced at very low cost and is capable of teaching virtually any type of motor response action and training or virtually any type of information, whereby to be suitable for widespread use in the teaching machine and motor response training art.

Further objects are implicit in the detailed description which follows hereinafter (which is to be considered as exemplary of, but not specifically limiting, the present invention), and said objects will be apparent to persons skilled in the art after a careful study of the detailed description which follows hereinafter.

For the purpose of clarifying the nature of the present invention, one exemplary embodiment of the invention is illustrated in the hereinbelow-described figures of the accompanying two sheets of drawings and is described in detail hereinafter.

FIG. 1 is a view illustrating a single projection panel frame means, and/or the image thereof, corresponding to the information setting the conditions of a sequence of problems which are to follow.

FIG. 2 is a view similar to FIG. 1, but illustrates the next projection panel frame means (and/or the projection image thereof) and shows both the upper problem presentation portion thereof and the lower coded correct answer and response portion. It should be particularly noted, however, that, in this case, all of the flight instrument images show the actual conditions which were to be maintained pursuant the instructions set forth in the preceding image shown in FIG. 1 and, therefore, no corrective action other than the maintenance of all four controls in the neutral or intermediate position is required of a student or trainee, since this projection image shows the desired condition to be subsequently maintained. Therefore, the answer or response projection code at the bottom of the image corresponds in each case to neutral position of each of the four controls.

FIG. 3 is a view similar to FIG. 2, but illustrates the next projection panel frame means (and the projection image thereof) and shows both the upper problem presentation portion thereof and the lower coded correct answer and response projection portion thereof.

Figure 7:
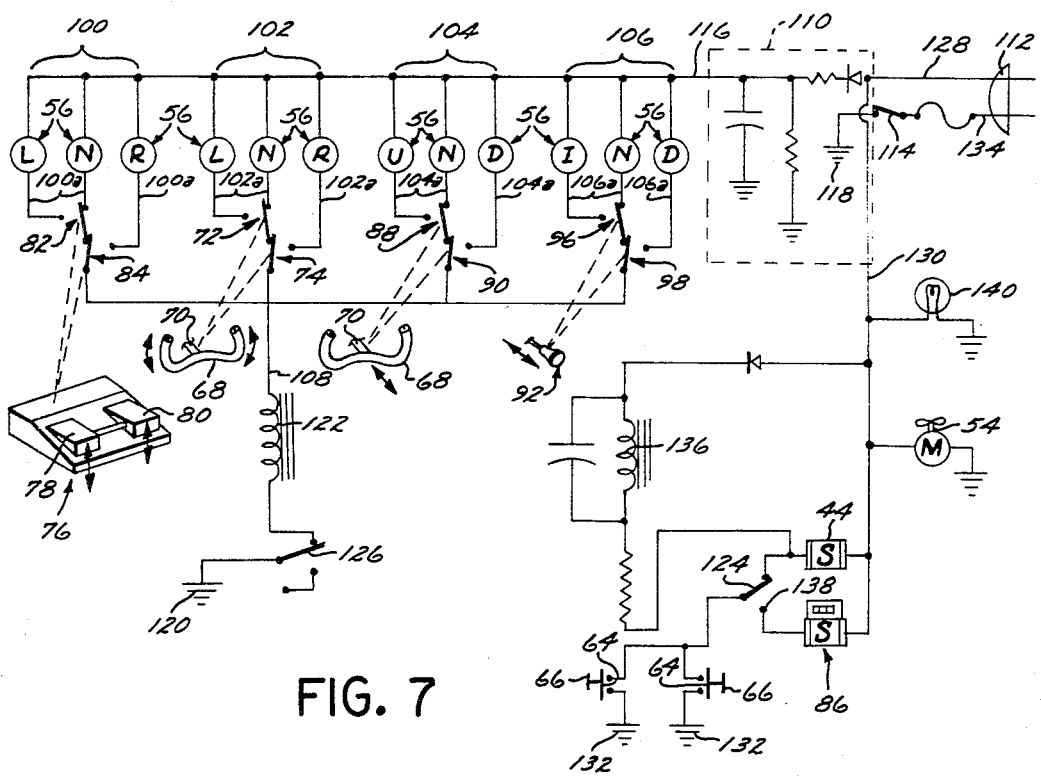

FIG. 4 is a somewhat diagrammatic and schematic view illustrating one typical cooperative relationship of the film strip means with respect to one particular type of teaching machine and/or motor response training apparatus, such as disclosed more particularly in our above-identified copending patent application, and particularly well adapted for cooperation with the novel article of manufacture of the present invention. This view shows the normal optical or projection path or circuit when the film strip is used in a normal back projection manner for visibly presenting to a student or trainee an image of the upper problem presentation portion of any particular projection panel frame means of the film strip while not displaying to the student a projected image of the lower coded correct answer and response portion of said projection panel frame means, but instead causing same to impinge upon the plurality of photosensitive means shown diagrammatically and schematically in FIG. 4. This view also shows, in somewhat diagrammatic and schematic form, the exemplary physical positionings of four different types of control means simulating those of a conventional airplane. These are merely shown diagrammatically in order to clarify the exemplary positional relationships thereof, but are not shown connected and in operative relationship with respect to the plurality of switch means operated thereby, which are indicated in FIG. 7. The detailed physical structure effectively connecting said controls with respect to said switches and with respect to the rest of the physical apparatus is more particularly disclosed in our above-identified copending patent application, and reference is made thereto.

FIG. 5 is an additional, somewhat diagrammatic and schematic view, illustrating the feeding of the film strip means into projected relationship with respect to the optical projector means of FIG. 4.

Figure 6:
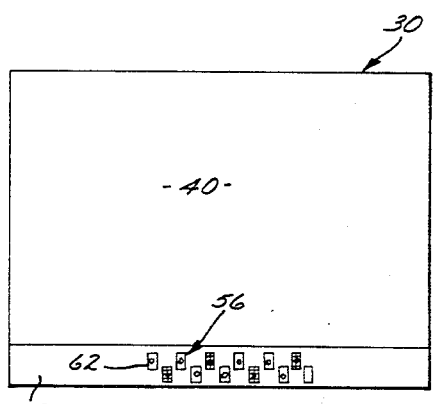

FIG. 6 is a further somewhat diagrammatic and schematic view, taken substantially on the plane indicated by the arrows 6—6 of FIG. 5, and diagrammatically illustrates from the rear the relative positioning of the upper problem presentation back projection viewing screen adapted to visibly display upon the other or front side thereof to a student the upper problem presentation portion of any particular projection panel frame means of the film strip and also clearly shows therebelow an opaque portion of the apparatus which cuts off from the student's view the lower correct answer and response portion of the image projected from any particular projection panel frame means of the film strip whereby to cause the coded answer regions of variable optical density (light and dark regions) to impinge upon the plurality of photosensitive means for correlation with the four control means shown diagrammatically in FIG. 4.

FIG. 7 is a circuit schematic view illustrating typical electrical circuitry of the exemplary type of apparatus, comprising a teaching machine or motor response training apparatus, shown in very diagrammatic, simplified, and fragmentary form in FIGS. 4–6 and which corresponds to that particular type of teaching machine and motor response training apparatus disclosed in detail in our above-identified copending application, to which reference is hereby made.

The exemplary form of the invention illustrated is shown as comprising a film strip 10 which includes a plurality of projection panel frame means, such as the three different sequential projection panel frame means generally designated at 12, 14, and 16 in FIGS. 1, 2, and 3, respectively, and each of which includes a visibly projectable upper problem presentation portion 18, 20, 22, as shown in said FIGS. 1, 2, and 3, respectively, and each of which also includes therebelow a correlated correct answer and solution presentation coded portion in the form of a region adapted to have variable density portions in a plurality of locations (actually, twelve locations in the exemplary form illustrated), as generally designated at 24, 26, and 28 in FIGS. 1, 2, and 3, respectively.

In order to fully understand the novel article of manufacture of the present invention as exemplified in one exemplary and non-specifically limiting form in said FIGS. 1, 2, and 3, it is believed to be necessary to describe it in conjunction with the diagrammatic, schematic, fragmentary, and essentially simplified teaching machine and/or motor response training apparatus illustrated in part in FIGS. 4–6 and in electrical schematic form in FIG. 7. Therefore, the specific detailed description which follows hereinafter refers to said apparatus and the various elements thereof, along with the novel projection panel frame means of the present invention, and it should be clearly understood that the only portion thereof which is specifically claimed as the present invention is the projection panel frame means and the various elements thereof, excluding the teaching machine and/or training apparatus, which is specifically claimed in our hereinabove-identified copending application. Therefore, the following detailed description is to be read and construed in the light of the statement just made above.

The film strip 10 may be used in a teaching machine or motor response training apparatus of a type such as is more particularly described, illustrated, and claimed in my hereinbefore-identified copending application, and such cooperation is illustrated in a somewhat diagrammatic and simplified manner with respect to the physical aspects thereof in FIGS. 4, 5, and 6, and is illustrated in electrical schematic form in FIG. 7.

In said FIGS. 4–6 inclusive, said teaching machine or motor response training apparatus is generally designated by the reference numeral 30 and effectively carries and is provided with what might be generally referred to as problem presentation means for visibly presenting one or more problems, either individually or in a related sequence of such problems, and adapted to be carried by the various projection panel frame means, such as the exemplary three shown at 12, 14, and 16 in FIGS. 1, 2, and 3 of the film strip 10, to a student or trainee, who will normally be positioned in front of the teaching machine or motor response training apparatus 30 for effective solution by said student or trainee.

In a case where the teaching machine or training apparatus 30 comprises a pilot training device of the exemplary and non-specifically limiting type diagrammatically, schematically, and in simplified form, illustrated in FIGS. 4–7 of the drawings, this will comprise an appropriate motor response by the student or trainee to various flight problems visibly presented to the student or trainee.

The above generically mentioned problem presentation means may include a number of different components, and the various components thereof can perhaps best be designated by a single reference numeral, as indicated in the simplified, diagrammatic, schematic view comprising FIGS. 4 and 5, wherein said complete problem presentation means is generally designated by the reference numeral 32.

It will be noted that the above-mentioned problem presentation means 32, in the exemplary, simplified arrangement illustrated diagrammatically and schematically in FIGS. 4–7, actually comprises a film strip, still picture type of optical projector means, which is generally designated in simplified, diagrammatic, schematic form at 34, and which is effectively provided with a pair of reflective mirror means 36 and 38, respectively. Also, said problem presentation means generally designated at 32 in said figures includes a back projection translucent type, relatively small projection screen means or viewing screen means 40, which is adapted to be physically mounted with respect to the teaching machine or training apparatus 30 in a manner such as to comprise an upper partial portion of a front wall thereof, as is perhaps best shown in FIGS. 5 and 6.

The above-mentioned projection or viewing screen means 40 may be a translucent panel of glass, plastic, or any other suitable material well adapted for back projection of any of a plurality of individual images thereon corresponding to upper problem presentation portions, such as those shown at 18, 20, and/or 22 in FIGS. 2 and 3 with any of a corresponding plurality of projection panel frame means, such as the three shown at 12, 14, and 16 in FIGS. 1, 2, and 3, respectively, and carried by the multi-frame film strip means 10, which is to be adapted to be fed sequentially, one frame at a time, into and through the optical projector means 34 with any of said plurality of individual frames in alignment with the optics thereof for such projection of the corresponding problem presentation upper portion, such as illustrated at 18, 20, or 22 in said FIGS. 1, 2, and 3, onto the projection or viewing screen 40 so that said problem will be visibly displayed to a student or trainee for an appropriate attempt at solution by said student or trainee by operating any of the four different control means referred to hereinafter in an appropriate and correct manner.

It should be clearly noted that the optical projector means 34, as mentioned above, is adapted to be provided with a plurality of the above-mentioned panel frame means, such as those illustrated at 12, 14, and 16 in FIGS. 1, 2, and 3, respectively, in the form of a multi-frame film strip means, such as that referred to hereinbefore, and generally designated at 10 in fragmentary form, which it will be noted is of a conventional type having drive sprocket holes 42 along the edges thereof and is adapted to be mounted on a conventional type supply reel, such as is generally and somewhat fragmentarily designated in simplified form at 43 in FIG. 5 and to be fed downwardly therefrom into the interior of the optical projector means 34 for sequential projection thereof by said optical projector means 34.

It should be noted that said projector 34 is of an intermittent type normally provided with film advancement means (not shown in FIGS. 4–6 in physical form) but clearly shown in electrical schematic form at 44 in FIG. 7 and which, in said electrical schematic form, is shown as comprising an electrical solenoid, which is adapted, through suitable mechanical intermittent action ratchet and pawl type of coupling means (not shown since such an arrangement is fully illustrated in our above-identified copending application) which is adapted to engage the sprocket holes 42 whereby to advance the film strip 10 a distance corresponding to one complete projection panel frame means, such as any of the three shown in enlarged form at 12 in FIG. 1, at 14 in FIG. 2, and at 16 in FIG. 3.

The optical projector means 34 may be provided with manually operable framing key means for properly framing any of the upper problem presentation portions such as shown at 18, 20, or 22 in FIGS. 1, 2, and 3, respectively, of the corresponding complete projection panel frame means such as shown at 12, 14, and 16 in FIGS. 1, 2, and 3, respectively, for proper alignment with respect to a conventional projection lamp means 140 (not shown in physical form for the same reasons as detailed above) of said optical projector means 34. The front end of the film strip 10 may be effectively taken up by a take-up reel means, such as shown in simplified, diagrammatic, fragmentary form at 46 in FIG. 5 and which is normally adapted to be effectively coupled with respect to the previously mentioned supply reel 43 by any of various types of coupling means, such as the resilient frictional type pulley belt means 48 and the two differently sized pulley sheaves 50 and 52 carried respectively by said take-up and supply reels 46 and 43 whereby to maintain the film strip 10 taut at all times by reason of the variable slippage allowed by the type of frictional engagement of the elastic resilient pulley belt member 48 with respect to said two differently sized pulley sheaves 50 and 52. The pulley belt 48 may comprise a loop formed of a helical spring means, for example, which provides the desired tension and yet allows controlled slippage with respect to the pulley sheaves as required or needed. It will be noted also that normally the two reels 43 and 46 are pivotally mounted with respect to each other to allow them to assume relative arcuate positions as determined by tension of the film strip 10 and the elastic pulley belt 48. This type of drive and feed structure is more fully detailed in our hereinbefore-identified copending application, as is the remainder of the teaching machine or training apparatus 30.

It should be noted that the conventional type optical projector means, generally indicated at 34, may additionally include a cooling fan which is not shown in physical form in the drawings, but which is designated schematically at 54 in FIG. 7. Further details of the optical projector means generally designated at 34 are not thought necessary in view of the more detailed disclosure thereof set forth in our above-identified copending application.

Incidentally, in connection with the previously described optical projection means generally designated at 34, it should be noted that the previously mentioned two mirror means 36 and 38 merely provide an effectively folded optical path having the proper total projection distance so that an enlarged image will be projected upon the back surface of the projection or viewing screen 40 in a manner such that the upper problem presentation portion of said image can be directly viewed by a student sitting or standing in front of said screen 40.

Incidentally, it should be noted that the lower correct answer and response portion of any of the projection panel frame means of the film strip 10, or the projected image thereof, as generally designated at 24, 26, or 28 at the bottom of each of the projection panel frame means generally designed at 12, 14, and 16, respectively, of FIGS. 1, 2, and 3, is so positioned as to be projected below the level of the viewing screen 40 so as to be completely invisible to the student or trainee. This is extremely important since such correct answer and response portions, such as shown at 24, 26, 28 in FIG. 1, 2, and 3, respectively, of any given projection panel frame means and the image projected thereby, will be received by the photosensitive means generally designated at 56, for providing the hereinafter described correlation electrical circuitry of the teaching machine or motor response training apparatus 30 with the necessary data for proper correlation and/or control with respect to the student's motor response actions to the problem visibly presented on the projection or viewing screen 40 so that the student's motor response actions can be automatically evaluated as to correctness or incorrectness and will correspondingly govern the subsequent operation of the complete apparatus.

Ssaid photosensitive means referred to above, and generally designed at 56, in the form illustrated, comprises twelve photocell means carried by mounting means comprising an opaque panel 58 mounted immediately below the projection or viewing screen 40. Said mounting means or panel 58 carries said twelve photocells 56 in a plurality of cylindrical shield members 60 to effectively provide a narrow optical reception angle therefor, which is directed rearwardly for receiving a corresponding plurality of light or dark, substantially rectangular regions of projected light, such as shown in phantom at 62 in FIG. 6 and as indicated at 62' with respect to the corresponding original projection panel frame means, such as at 14 and 16 in FIGS. 2 and 3.

It should be understood that said plurality of light and dark regions 62' carried at the bottom of each projection panel frame means 14 or 16 in FIGS. 2 and 3 effectively comprise the previously generically referred to lower correct answer and response portion 26 and 28, respectively, of each projection panel frame means 14 and 16, respectively, of the film strip 10.

It should be noted that the proper coding of said rectangular correct answer portions, comprising the twelve light or dark regions 62', and the corresponding projection images 62 shown in phantom in FIG. 6, provide all necessary information as to the correct solution and correct motor responses of a student pilot or trainee to the problem visibly presented by the corresponding upper problem presentation portion, generally designated at 20 and 22, respectively, of the corresponding projection panel frame means 14 and 16, respectively, of FIGS. 2 and 3.

It will be noted that said upper problem presentation portion 18, in the case of FIG. 1, merely comprises the visible presentation of certain information or data about the conditions governing a series of subsequent problems. In this first frame of a problem sequence, as shown at 12 in FIG. 1, the lower correct answer and response portion is generally designated at 24, and is completely dark. In other words, this corresponds to having all of the twelve possible light and/or dark answer code portions 62' dark, which corresponds to no answer required on the part of the student or trainee whatsoever relative to any of the controls carried by the machine and simulating conventional airplane controls. Therefore, said first problem presentation upper portion 18 of the first projection panel frame means 12 of a problem sequence requires no control action on the part of the student and, upon operation of either of two film advancement switch means 64 by pressing either of the film advancement pushbuttons 66, the film advancement means 44 will operate to advance the film strip 10 from the first frame 12 to the second frame 14. Then the optical projector means 34 will project an image of the upper problem presentation portion 20 of said second projection panel frame means 14 on the projection or viewing screen 40 so that the student may look at the representations of the six conventional airplane instruments conventionally carried on the instrument panel of an airplane to determine whether or not the hypothetical airplane is operating in accordance with the instructions supplied to the student by the previous projection panel frame means 12. It should be noted that the lower correct answer portion comprising the twelve light or dark answer code regions 62' will not be seen by the student but will be received by the twelve photocells 56.

The six airplane instruments shown in the projection panel frame means 14 comprise in the top row, reading from left to right, an air speed indicator, an azimuth heading indicator, an artificial horizon simulating instrument indicating the relative position of the airplane with respect thereto around a longitudinal fore and aft axis of rotation and a lateral left-to-right axis of rotation perpendicular to said longitudinal axis, and, in the bottom thereof, said instruments comprise an altimeter, a left and right turn and bank indicator, and a climb or descent indicator indicating whether the airplane is climbing, descending, or in level flight and the relative angular relationships of such climbing or descending flight with respect to level flight as a reference in terms of rate of climb or descent per unit of time. It will be noted that the six airplane instruments shown in the projection panel frame means 14 of FIG. 2 and which will, of course, be projected onto the viewing screen 40 and viewed by the student or trainee, clearly indicate that the hypothetical airplane is performing in exact accordance with the information supplied in and preceding projection panel frame means 12 and that, therefore, no corrective control response action of a type altering the operation of the hypothetical airplane is needed. All that is required for the student to do is to maintain an intermediate or neutral position of each of the four controls, and this is precisely what the answer code pattern of light and dark regions, as indicated at 62' in FIG. 2, and the projected images thereof, as indicated at 62 in FIG. 6, correspond to.

In other words, as long as the student leaves each of the four controls in neutral position, when he operates the film advancement pushbutton 66, the film advancement means 44 will advance the film strip 10 into the next projection position with the projection panel frame means 16 in projection relationship with respect to the optical projector means 34.

Careful examination of the information supplied by the six airplane instruments, as shown in said projection panel frame means 16, which will, of course, be the image projected on the viewing screen 40, clearly indicates that now some corrective action is required on the part of the student or trainee, and this comprises appropriate operation of the proper one or more of the four controls to cause the upper right hand instrument, comprising the artificial horizon indicating instrument, to return to the relationship thereof shown in the preceding projection panel frame means 14. The student's problem is to determine which one or more of the four controls he should operate, and in what manner he should operate same, to bring about this return of the appearance of said upper right hand instrument to that shown in the preceding projection panel frame means 14 as illustrated in FIG. 2.

It is apparent that what said instrument indicates is that one wing of the airplane is down and that the correct response action required to return the airplane to the original conditions specified in projection panel frame means 12 shown in FIG. 1 is the operation of an aileron control means and coordinated operation of a rudder control means in the proper manner. This is clearly indicated by the left group of three light and dark rectangular regions 62' and the next group of three light and dark rectangular regions 62' of FIG. 3 when compared to the relative positional orientation thereof, as shown in FIG. 2.

Therefore, if the student or trainee grasps the partial wheel simulating member shown diagrammatically at 68 and rotates same around the longitudinal shaft member 70, which structures comprise what might be termed airplane aileron control means, the aileron control switch means, indicated at 72 and 74, will be appropriately operated for correlation with the corresponding one of the previously mentioned photocell means 56 upon which the relatively dark rectangular answer code portion 62' is projected, whereby to provide a correct response as far as said aileron control response action is concerned.

Then if the student or trainee also appropriately operates the rudder control means, generally designated at 76, by operating either the left or right foot pedal portions 78 or 80 thereof in the proper manner, a corresponding rudder control switch means 82 or 84 will be appropriately operated for correlation with the corresponding one of the previously mentioned photocell means 56 upon which the relatively dark rectangular answer code portion 62′ is projected whereby to provide a correct answer as far as said rudder control is concerned.

If both said aileron control means 68, and the aileron control switch means 72 and 74, and said rudder control means 76 are properly operated by the student or trainee in the manner just referred to and corresponding to the two left groups of staggered light and dark projection regions 62′ shown in the bottom correct answer projection portion 28 of the projection panel frame means 16 of FIG. 3, then operation of either of the manual advancement pushbuttons 66 will cause the film advancement means 44 to move the film strip 10 to the next film projection panel position (not shown). This type of operation may continue through an entire sequence of problems as presented by a corresponding number of projection panel frame portions on the film strip 10 and, in each case, the operation of the various control means in the proper manner will allow the subsequent operation of either of the manual advancement pushbuttons 66 to advance the film strip 10 one frame to the next problem.

However, whenever an incorrect response is made by a student or trainee by the incorrect operation or lack of operation of any of the four controls, then operation of either of the manual advancement pushbuttons 66 by the student or trainee will not result in energization of the film advancement means 44 and, therefore, will not bring about advancement of the film strip 10 to the next projection panel frame means thereof, but will result in operation of an error counter, generally indicated at 86.

The other two types of controls provided in the exemplary pilot training form of teaching machine illustrated comprise an airplane elevator control means and an airplane engine throttle control means, with each being provided with appropriate operating means and switch means in a manner similar to the aileron control means and rudder control means previously described.

In the exemplary form illustrated, said airplane elevator control means partially comprises the same elements as the previously described aileron control means and includes the partial wheel-simulating means 68, and the longitudinal shaft member 70, which is longitudinally mounted for fore and aft sliding action in the manner of a conventional airplane control means and is adapted to operate the corresponding elevator switch means 88 and 90, respectively, for connection with respect to the corresponding *one* of the group of three photocell means 56 of FIG. 6 upon which the *dark* projection answer code region is projected when a correct answer and response is provided to any particular problem presented on the viewing screen 40.

In the exemplary form illustrated, the above-mentioned airplane engine throttle control means is generally designated at 92, and comprises an actuating handle 94 connected to a longitudinally slidably mounted rod member 95 which is adapted to operate corresponding throttle switch means 96 and 98 in a manner similar to the operation of the elevator switch means 88 and 90 and adapted to correlate with the corresponding engine throttle photocell means 56 of FIG. 6 for indicating a correct or incorrect motor response answer on the part of a student or trainee with respect to a problem visibly presented on the viewing screen 40.

In the exemplary arrangement shown in FIGS. 2 and 3, it should be noted that the rectangular answer code projection regions 62′, as pointed out above, are twelve in number, and that, actually, each group of three thereof corresponds to one of the four types of controls mentioned hereinbefore as comprising the rudder control means, the bank or aileron control means, the elevator control means, and the engine throttle control means, and, in fact, each group of three light and dark answer code regions 62′ (in each case including one dark and two light regions) are arranged from left to right in accordance with the control sequence just referred to. That is, referring to FIG. 2, the left group of three rectangular answer projection regions (comprising two lower light regions and one upper dark region) correspond to the rudder control, the next group of three rectangular answer code projection regions (comprising one lower dark and two upper light regions) correspond to the aileron control, the next group of three rectangular answer code projection regions (comprising one upper dark and two lower light regions) correspond to the elevator control and the final or right hand group of three answer code projection regions (comprising one lower dark and two upper light regions) correspond to the engine throttle control, and, in each case, it will be noted that the intermediate rectangular projection region of each group of three is the dark one, while the other two are the light ones. This, as previously mentioned, corresponds to a neutral or unchanged operation of all four of said controls, comprising the rudder control, the aileron control, the elevator control, and the throttle control, while the showing of FIG. 3 indicates that the required corrective action is operation of the left rudder pedal 78 and operation of the aileron control means into the left position by turning the shaft 70 in a counterclockwise direction as viewed head on. Incidentally, it should be noted that each of the control members is effectively spring biased and adapted to return automatically to the normal neutral position.

The following description can best be understood by reference to FIG. 7 comprising a circuit schematic of the exemplary form of the invention.

It should be noted that each of the four types of controls, comprising a rudder control, an aileron control, an elevator control, and a throttle control, as previously mentioned, is effectively provided with a corresponding electric circuit control portion, such as generally designated at 100, 102, 104, and 106, electrically connected in parallel with respect to each other as is clearly shown in FIG. 7 and provided with, and connected in series with respect to, a common error circuit portion 108, with said parallel control circuit portions and said common error circuit portion 108 being adapted to be connected between the terminals of an electric power supply source. One such power supply source is indicated in broken line, block diagrammatic form at 110 in FIG. 7, and is illustrated as comprising rectifier, filter, and voltage-reducing means of well known conventional types adapted to be supplied with a conventional 110–120 volt alternating current from a plug or connector 112 through main control switch 114 and which is adapted to supply through an output lead 116 a rectified, filtered, reduced voltage of a magnitude such as 26 volts D.C., for example, although not specifically so limited; said lead 116 effectively comprising one of the aforementioned power supply terminals, the other one of which effectively comprises the ground connection indicated at 118 which, of course, connects to the ground connection 120 at the lower end of the common error circuit portion 108.

Each of the above-mentioned parallel control circuit portions 100, 102, 104, and 106 is provided with corresponding control switch means 82 and 84, 72 and 74, 88 and 90, and 96 and 98, effectively operable in correspondence with the operation of the corresponding rudder control means 76, the corresponding aileron control means 68 and 70, and the corresponding elevator control means 68 and 70, and/or the corresponding throttle control means 92, whereby, in each case, to connect only one of the three possible answer circuit portions 100a, 102a, 104a, and/or 106a of the corresponding four different control circuit portions generally designated at 100, 102, 104, and 106.

Each of said three answer circuit portions 100a, 102a, 104a, and 106a of said four control circuit portions generally designated at 100, 102, 104, and 106, is provided in series therewith with a corresopnding one of the previously mentioned twelve photocells 56, which are of a type which normally has an extremely high resistance—in other words, its "dark resistance" is quite high—but which is adapted, upon the reception of a substantial quantity of light thereon, to have its resistance greatly reduced, in other words, to have a "light resistance" of a relatively small magnitude much less than its "dark resistance." It will be clear, upon careful examination of FIG. 7, that when any particular problem is visibly presented to a student by projection of the upper problem presentation portion 22, such as shown in FIG. 3, for example, the dark one of the answer code projection rectangular portions or regions 62′ in each of the four groups of three thereof will cause a corresponding dark projection region 62 which will effectively provide the high resistance photocell 56 in that particular group of three photocells, and this will be the one of the three corresponding possible answer circuit portions 100a, 102a, 104a, or 106a, which is to be connected in series to the common error circuit portion 108 by appropriate operation of any of the corresponding four sets of switch means 82 and 84, 72 and 74, 88 and 90, or 96 and 98, by operation of any of the corresponding rudder control means, aileron control means, elevator control means, and/or throttle control means.

When the correct response is provided and the dark photocell in each set of three of the four different groups thereof is connected to the common error circuit portion 108, the magnitude of electric current in said common error circuit means 108 will be below a predetermined minimum relay actuation value such as to be incapable of energizing the common error circuit relay operating coil means 122 to a degree such as to open the normally closed error relay switch means 124. Of course, the switch means 126 in the common error circuit relay portion 108 is normally in the position shown in FIG. 7 connecting said error circuit portion 108 to ground at 120 and, therefore, to the power supply 110.

Under the conditions of operation just described, the error relay switch 124 will remain in the position shown in FIG. 7 and, after the student is satisfied that he has taken the correct response action to a problem visibly presented on the viewing screen 40 by appropriate operation of the rudder control, the aileron control, the elevator control, and/or the throttle control, as referred to hereinbefore, then the student or trainee may operate either of the manual advancement pushbuttons 66, and this will connect one of the main A.C. input leads 128 by way of a lead 130 to one side of the previously mentioned film advancement solenoid 44 which has its other side connected through the normally closed error relay switch means 124 and the temporarily manually closed advancement pushbutton switch means 64 to ground, as indicated at 132, which, of course, is connected to the ground terminal 118 and to the other A.C. input lead 134, thus causing a single energization of said film advancement solenoid 44 and causing the film strip 10 to advance one frame with respect to the optical projector means 34.

At the same time that the above action occurs, it should be noted that the lead 130 also connects the reset relay actuating coil means 136 through the previously mentioned normally closed error relay switch means 124 to said ground terminal 132 and thus operates the previously mentioned normally closed reset relay switch means 126 in the common error circuit 108 and effectively opens same and disconnects said common error circuit 108 from ground at 120 and, therefore, from the ground side of the power supply 110. This, of course, temporarily inactivates all of the control circuits 100, 102, 104, and 106, until such time as the manual advancement pushbutton 66 is released at which time de-energization of the reset relay actuating coil 136 will occur and also de-energization of the film advancement solenoid 44 will occur. The de-energization of said reset relay actuating coil means 136 will allow the reset relay switch means 126 to again move into the normally closed relationship shown in FIG. 7, whereby to again connect the common error circuit portion 108 to ground at 120 and, therefore, to the ground side of the power supply 110, and thus place all of the control circuit portions 100, 102, 104, and 106 again in condition for operation.

The above describes the sequence of operations when a correct response to a visibly presented problem is made by a student or trainee by properly operating any or all of the four controls. However, in the event that a problem visibly presented on the projection or viewing screen 40 is not properly solved or responded to by a student or trainee by correctly operating one or more of the four control means, then it will be found that in at least one of the four control circuit portions 100, 102, 104, and 106, at least one of the highly illuminated photocells 56 will be connected by the corresponding sets of switches 82 and 84, 72 and 74, 88 and 90, and/or 96 and 98, to the common error circuit portion 108 which will thus allow a current of much greater magnitude than that described above for correct response action on the part of a student to flow therethrough and through the error relay actuating coil means 122 which is coupled in operating relationship with respect to the previously described normally closed error relay switch means 124 and which will then effectively open same or move it from the relationship shown in FIG. 7 and previously described above so as to effectively prevent energization of the film advancement solenoid 44 and also to prevent energization of the reset relay actuating coil 136, but so as to positively connect said error relay switch means 124 to an alternate error counter circuit contact means 138 which is electrically connected to one side of the previously mentioned error counter (usually solenoid operated) 86 which has its opposite side connected to the previously mentioned A.C. lead 130, thus causing operation of said error counter 86 just as soon as the student or trainee decides to test the correctness of his response by operating the manual advancement pushbutton 66 which will effectively apply power through said error relay switch means 124 to said error counter 86.

Thus, the error counter's numerical display means will advance one number each time the manual advancement pushbutton 66 is depressed by a student or trainee to test the correctness of his preceding responsive action, and each such actuation of the manual advancement pushbutton 66 will not cause the film strip 10 to advance since no energization of the film advancement means 44 will occur. This condition will continue to prevail until the student or trainee has finally taken the correct responsive action to a visibly presented problem by properly operating any or all of the four control means comprising the rudder control means, the aileron control means, the elevator control means, and/or the throttle control means, to disconnect the previously mentioned highly illuminated photocell (or plurality of photocells) 56 from the common error circuit 108 so that the magnitude of the current flowing through the error relay actuating coil 122 drops substantially to a value below a predetermined magnitude such as to allow the error relay switch means 124 to return to its normal position as shown in FIG. 7, whereupon the previously described sequence of operations which occurs upon a correct responsive action on the part of the student or trainee will then prevail.

It should be noted that in FIG. 7 all of the relays are shown in de-nergized relationship, which is the relationship corresponding to a proper responsive action on the part of a student.

The A.C. electrical input provided by the input leads 128 and 134 is applied directly to the projection lamp 140 and the projector cooling fan 54 by the lead 130 whenever the main control switch 114 is closed.

To sum up, a brief generalized description of the circuit logic of the arrangement described in detail above follows below.

It will be noted that a student or trainee, upon presentation of a projected image from the film 10, is required to make one or more correct control motions, of which a single control motion or a plurality thereof actuate one or more of the series of switches 82 and 84, 72 and 74, 88 and 90, and/or 96 and 98, as shown in FIG. 7. A correct control motion is one that switches a corresponding non-conducting one of the photocells 56 into the common error relay circuit portion 108. When this is accomplished, all of the circuit relay positions are as shown in FIG. 7. Upon closing the manual advancement pushbutton switch 64 by pressing either of the manual advancement pushbuttons 66, the answer or reset relay actuating coil 136 and the film advancement solenoid 44 are energized and remain so as long as the manual advancement switch 64 is kept closed. After advancement of the film 10 by the film advancement means 44, the manual advancement pushbutton operating switch 64 should be released into its normal open relationship. If it is not released after such film advancement, then no further film advancement or errors can be recorded, regardless of what control action with respect to the various control means is taken by a student or trainee because the answer or reset relay switch means 126 is held in open position by the actuating coil 136 and, therefore, the error relay actuating coil 122 is out of the circuit and effectively de-energized. When the manual advancement switch 64 is opened, the circuit and relay logic is restarted.

An improper control action or motion on a student's or trainee's part is one which switches one or more of the conducting photocells 56 into the common error relay circuit portion 108. When this happens, the error relay actuating coil 122 is energized and operates the error relay switch means 124 so as to connect the error counter solenoid 86 with respect to the power supply 110 and the manual advancement pushbutton switch means 64 and, at the same time, the answer or reset relay actuating coil 136 is effectively disconnected from the manual advancement pushbutton switch means 64. Then, when the manual advancement pushbutton 64 is closed, the error counter solenoid 86 is energized and an error is registered, and this is the only action which occurs at that time. Then said manual advancement pushbutton 64 should be opened. If, however, any of the control means are moved while said manual advancement pushbutton switch means 64 is still closed and if said control movement is to an incorrect position, no further error will be recorded since the error counter solenoid 86 will remain in the energized position. If any of said four control means is moved to a correct position while said manual advancement position pushbutton switch means 64 is still closed, the film strip 10 will advance and the circuit logic becomes the same as for a correct response, as described above.

It should be clearly noted that the type of problem presented is not limited to the presentation of the visual appearance of six conventional aircraft flight instruments of the type clearly shown in FIGS. 2 and 3, but other instruments, such as navigation instruments, might be visibly presented in image form and provide a navigational problem for the student pilot, or various simulated visual contact conditions presenting situations which simulate those which a student pilot might actually see in flight and which require corrective action on the student's part, may be visibly presented for the purpose of providing the problem for the student to solve. Also, it should be clearly noted that fewer than the number of instruments shown may be employed, and that various other types of instruments or problem presentation means for providing training in a great variety of other types of motor response may be employed in lieu thereof. Additionally, in some cases, the apparatus may comprise a direct teaching machine where the answers may require only two extremes— that is, either yes or no, or the like, or multiple choice answers. In either case, all that is necessary is to provide the proper number of control circuit portions, such as at 100, 102, 104, and 106 in FIG. 7, to correspond to the required types and number of answer operations and/or to correspondingly modify the number of possible answer circuit portions such as shown at 100a, 102a, 104a, and 106a in FIG. 7 and to correspondingly modify the projection panel frame means of the film strip. Thus, it will readily be understood that the circuit logic and the broad principles of the present invention may be adapted to virtually any type of teaching machine situation. For example, it should be noted that with the four different types of controls illustrated in the exemplary form of the invention shown in the drawings and described in detail hereinbefore, 81 different multiple choice answers are possible since there are four different controls and each may assume three different positions. This obviously means that, when adapted to multiple choice problem presentation and solution purposes, one or more upper problem presentation portions of one or more projection panel frame means may present a problem and a large number of multiple choice answers which may be discrete separate answers or answers with a plurality of major headings or generic statements, each having a plurality of subheadings comprising primary modifiers or species statements and, in certain cases, with each of said modifiers or species statements having a plurality of additional submodifiers or subspecies statements. Obviously, this greatly extends the scope of teaching machine performance.

It should be noted that, in the preferred exemplary form of the invention specifically illustrated in the drawings and described hereinbefore, the projection panel frame means takes the form of a continuous film strip having a plurality of individually successive projection panel frame means which, in said exemplary illustrated form may include a sequence of projection panel frame means wherein the first projection panel frame means thereof normally has a portion bearing visibly projectable information specifying the conditions of a number of subsequent problems and wherein the successive projection panel frame means along the film strip and positioned for viewing in succession thereafter, each presents in the upper projectable problem presentation portion thereof a different problem related to the initial condition specified in the first projection panel frame means and each having at the bottom thereof a different set of projection answer code portions indicating the proper responsive action on the part of the student or trainee for the correct solution of the problem visibly presented by the corresponding upper problem presentation portion of that particular projection panel frame means. In other words, in the exemplary arrangement illustrated and described, a sequence is provided comprising a plurality of connected projection panel frame means on a film strip all relating to different problems governed by common conditions which are specified in the first projection panel frame means of said sequence. However, it should be noted that this should not be construed as limiting the invention to the particular arrangement illustrated and described. For example, it is also possible to have a longer film strip bearing several different sets of such sequences, with each sequence beginning with a different projection panel frame means specifying a different set of governing conditions which will govern the remaining projection panel frame means of that particular sequence in the presentation of various different problems related to said particular specified governing conditions. Also as pointed out hereinbefore, individual problems may be set forth in different projection panel frame means rather than a sequence of connected problems governed by an initially specified common set of conditions.

Additionally, it should be noted that while a preferred form of the invention described and illustrated in detail herein, refers to the projection panel frame means as being in the form of a film strip which is readily adapted for use in various conventional types of such intermittent action, still picture type of projectors for such film strips, it should be understood that the projection panel frame means of the invention is not limited to being in continuous film strip. Actually, each projection panel frame means may be in any projectable form, whether physically connected with respect to the next projection panel frame means to be viewed thereafter or not. In fact, a plurality of completely independent slide members, or the like, comprising independent transparencies or reflection type individual projection panel frame means for use in socalled opaque projectors, and not physically connected together in the manner of a continuous film strip, may be employed and, in this case, they may be initially stored, stacked, or arranged in any desired feeding relationship with respect to a projector, whereby to bring about the desired succession of projection panel frame means in projection relationship with respect to an optical projector means. Also, any other arrangement functionally equivalent to the arrangements just described are intended to be included and comprehended within the broad scope of the present invention.

Additionally, it should be noted that the reference in the present specification and claims to the problem presentation portion of each projection panel frame means as being an *upper* portion and the correct answer and response portion thereof as being a *lower* portion, as only to clarify the illustrations shown in the drawing wherein said relative portions of each projection panel frame means are so positioned. Actually, it should be understood that even with reference to said figures of the drawings, said positioning refers primarily to the projected images adapted to be viewed on the viewing screen since conventionally the film strip itself is fed into the optical projector in inverted relationship. Therefore, said use of the words, "upper" and "lower," are to be broadly construed as merely being exemplary of the presentation of the image in the particular form of the invention illustrated herein and to in no way limit the invention thereto since, actually, the problem presentation portion and the coded correct answer and response presentation portion of each projection panel frame means may be positionally modified very substantially from the showings of the drawings of the present invention within the broad scope of the present invention, and all such modifications are intended to be included and comprehended herein.

It should be noted that, in certain forms of the invention a particular problem or sequence of problems may be presented by more than one projection panel frame means bearing initial governing instructions intended to specify the conditions of the succeeding sequence of problems. In other words, the invention is not limited to one such initial instruction panel as referred to hereinbefore.

It should also be noted that the number of photocell means, the positionings thereof, and the pattern or arrangement thereof, may be modified substantially within the broad scope of the present invention in accordance with the type of problems presented for answering and response. Also, it should be noted with respect to the particular type of photocells illustrated in the drawings and described in detail hereinbefore wherein reference is made to "light resistance" and "dark resistance," the first expression is intended to mean the electrical resistance of the photocell when it is illuminated to a very substantial degree—in other words, when it receives a considerable amount of light, while the second term referred to above is intended to mean the electrical resistance of a photocell when it is substantially non-illuminated or receives light of such an extremely low level of illumination as to be substantially dark, comparatively speaking, with respect to the above-mentioned illuminated or "light" condition thereof. One exemplary type of such photocell means comprises cadmium sulfide cells or photocells made of other suitable photoconductive material responsive to high and low level illuminations by correspondingly varying the electrical conductivity thereof between corresponding high and low levels. However, various other types of photosensitive or photoresponsive means may be employed in lieu of the specific ones just referred to.

Throughout this application, reference has been made to the teaching machine or motor response training apparatus being intended for use by students or trainees. However, this is not to be construed as specifically limiting the invention in any manner since actually it may be very advantageously employed by rated pilots for proficiency, testing, and/or checking purposes.

The light and dark rectangular regions 62' comprising the correct answer and response code portion of each projection panel frame means is illustrated in a form wherein the rectangular height of each such code portion 62' is substantially greater than its width. This is primarily because there is little need for lateral corrective positional compensation of said projection code means 62', as compared to the substantially greater need for longitudinal or vertical corrective positional compensation thereof since the film strip 10 will not shift laterally to any substantial degree in the optical projector means 34 while a considerably greater degree of longitudinal (or vertical) relative positional displacement or misplacement of the film strip 10 may occur during the operation of the projector means 34 by reason of the nature of the film drive, backlash, and the like. Therefore, the projection code means 62' is very closely spaced laterally for maximum use of the available space and has the staggered, zigzag, vertical arrangement illustrated in FIGS. 1–3 and the rectangular, vertically increased height of each of the projection code portions 62' clearly illustrated in said figures in order to compensate for any relative longitudinal (or vertical) displacement of the film 10 so that images projected therefrom onto the photocells 56 as is best shown in 62 in FIG. 6 will still impinge upon the proper ones of said photocells even if a slight longitudinal (or vertical) displacement of the film 10 has occurred after the initial framing of the first frame of the film strip 10 when the presentation of a sequence of problems initially began.

It should be noted that the answer code portions at the bottom of each projection panel frame means, such as generally designated at 24, 26, and 28 in FIGS. 1, 2, and 3, respectively, are shown as having a black or dark background with all of the light rectangular projection code portions 62' being shown as white, while all of the dark projection code portions 62' are illustrated in a color-coded form corresponding to and designating black, The reason why said dark or black rectangular projection code portions 62' are color-coded rather than being shown in solid black in a manner similar to the showing of the background is in order to facilitate distinguishing the two on the drawings. In reality they would both appear black. Incidentally, another simplification occurs in said views of the drawing in that each of the projection panel frame means is shown as having a light background with instructions in the case of FIG. 1, and the instrument panel scales or indicia means, or the like, in the case of FIGS. 2 and 3, being shown in black, whereas, in actuality the usual arrangement is the reverse of that shown in the drawings—that is, with a dark or black background and with instructions, such as shown in FIG. 1, and the readings on the instrument panels, such as is shown in FIGS. 2 and 3, being white or light in contrast to the black background of each of said problem presentation portions of each of the projection panel frame means. It should be understood that this is done merely for the sake of drawing convenience and is in no way to be construed as limiting the invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

We claim:

1. Projection panel means for use in visibly presenting a problem for response and solution and for correlatedly presenting to a teaching machine an answer code portion bearing information as to the correct response and answer to the problem visibly presented, comprising: at least one projection panel frame means having a visibly projectible and visibly perceivable problem presentation portion and a non-visibly projectible and visibly non-perceivable correlated correct answer and response indicating projection portion in the form of a projection answer code comprising a plurality of light and dark projection answer code portions, said correct answer and response indicating projection portion in the form of an answer code being so positioned with respect to the visibly projectible and visibly perceivable problem presentation portion as to be out of the field of view on a projection and viewing screen upon which said problem presentation portion of said projection panel frame means is adapted to be projected, and said correct answer and response indicating projection portion in the form of an answer code being so positioned with respect to the visibly projectible and visibly perceivable problem presentation portion of said projection panel frame means as to be adapted to impinge upon corresponding photosensitive means of a teaching machine associated with said projection and viewing screen on which said visibly projectible and visibly perceivable problem presentation portion of said projection panel frame means is adapted to be projected; each of said plurality of light and dark projection answer code portions comprising a plurality of vertically adjacent horizontal rows of individual projection code regions of substantially rectangular shape and of two different extreme values of optical density, taking the form of high-density regions and low-density regions, with each high-density region corresponding to a correct response to a problem visibly perceivably presented by the corresponding problem presentation projection portion of said projection panel frame means, and with each low-density region corresponding to an incorrect response to a problem visibly perceivably presented by the corresponding problem presentation projection portion of said projection panel frame means, said plurality of individual projection code regions including a plurality of different groups thereof, each corresponding to a different problem portion having a multiple choice response, with each such group of said plurality of individual projection code regions including only one of said high density regions corresponding to a correct multiple choice response to the multiple choice problem portion corresponding to that particular group of said plurality of individual projection code regions, with the remainder of the plurality of individual projection code regions of that particular group all being of said low density type corresponding to different multiple choice incorrect responses to the multiple choice problem portion corresponding to that particular group of said plurality of individual projection code regions; each visibly perceivable problem presentation portion comprising a substantially rectangular upper projection portion of the corresponding projection panel frame means, each correct answer and response indicating projection portion of each projection panel frame means comprising a lower portion thereof below the level of the problem presentation projection portion thereof and positioned so as to be out of the field of view of a projection and viewing screen upon which the upper problem presentation portion of said projection panel frame means is adapted to be projected.

2. Projection panel means as defined in claim 1, including at least one projection panel frame means at the beginning of any sequence thereof which is provided with projection image-producing means corresponding to the conditions of a plurality of successive problems to be visibly projectibly and visibly perceivably presented by a corresponding plurality of said problem presentation projection portions of a corresponding plurality of succeeding projection panel frame means, each, as aforesaid, being provided with a corresponding one of said correct answer and response indicating projection portions in the form of an answer code positioned for optical projection and impingement upon and reception by said photosensitive means of said teaching machine.

3. Projection panel means comprising: a plurality of individually successive projection panel frame means in the form of a length of film strip with said plurality of projection panel frame means being adapted to be individually and partially projected upon a projection and viewing screen and viewed by a user of a teaching machine and motor response training appaartus in a manner such that said user may be visibly presented with a problem which requires an appropriate response or solution by said user with respect to individually operable controls comprising a part of said teaching machine and motor response training apparatus; each projectible one of said projection panel frame means having a visibly projectible and visibly perceivable problem presentation portion and a non-visibly projectible and visibly non-perceivable correlated correct answer and response indicating projection portion in the form of an answer code comprising a plurality of light and dark projection answer code portions, each of substantially rectangular form, adapted to be projected upon and received by corresponding photosensitive means comprising a part of said teaching machine and motor response training apparatus for correlation with the proper or improper operation of the corresponding controls of said teaching machine and motor response training apparatus for indicating to said user thereof whether or not he has provided the correct solution and taken the correct responsive action and for correspondingly allowing manually initiated operation of an optical projector portion of said teaching machine and motor response training apparatus for moving the next projection panel frame means of a sequence thereof into projection relationship with respect to said optical projector portion of said teaching machine and motor response training apparatus, each visibly perceivable problem presentation portion comprising a substantially rectangular upper projection portion of each projection panel frame means, each correct answer and response indicating projection portion of each projection panel frame means comprising a lower portion thereof below the level of the problem presentation projection portion thereof and positioned so as to be out of the field of view of a projection and viewing screen upon which the upper problem presentation portion of said projection panel frame means is adapted to be projected, said lower correct answer and response indicating projection portion of each projection panel frame means comprising a pair of vertically adjacent horizontal rows of said plurality of light and dark projection answer code portions, taking the form of a plurality of individual projection code regions of said substantially rectangular shape and of two extreme values of optical density, taking the form of high density and low density regions, with the high density regions corresponding to correct answers and responses to the problem visibly perceivably presented by the corresponding problem presentation projection upper portion of a corresponding projection panel frame means, and with the low density regions corresponding to incorrect answers and responses to the problem visibly perceivably presented by the corresponding problem presentation projection upper portion of said projection panel frame means, individual projection answer code regions lying in different ones of said vertically adjacent horizontal rows thereof being horizontally longitudinally displaced out of vertical alignment with respect to each other into an effectively alternating, staggered relationship, said plurality of individual projection code regions including a plurality of different groups thereof, each including three individual projection code regions, with each different group corresponding to a different problem portion of a particular problem visibly perceptibly presented by the corresponding problem presentation projection upper portion of the corresponding projection panel means and having a triple choice response, with each such group of three different ones of said plurality of individual projection code regions having one of said projection code regions positioned in a first one of said pair of vertically adjacent horizontal rows thereof and having the other two of said projection code regions positioned in the other one of said pair of vertically adjacent horizontal rows thereof and being horizontally laterally spaced apart so as to lie at each side of but similarly vertically displaced from said first mentioned individual projection answer code region positioned in said first horizontal row, thus causing said plurality of groups of answer code portions to alternately laterally sequentially define V-shaped and inverted V-shaped arrays of sets of three answer code regions corresponding to each of said plurality of groups thereof, each such group of three individual projection code regions including only one of said high density regions corresponding to a correct multiple choice response to a multiple choice problem portion corresponding to that particular group of said plurality of individual projection code regions, with the other two individual projection code regions of that particular group of three thereof both being of said low density type corresponding to different multiple choice incorrect responses to a multiple choice problem portion corresponding to that particular group of said three individual projection code regions; at least one projection panel frame means at the beginning of a sequence thereof being provided with projection image-producing means corresponding to the conditions of a plurality of successive problems to be visibly perceivably presented by a corresponding plurality of said problem presentation projection portions of a corresponding plurality of succeeding projection panel frame means, each, as aforesaid, being provided at the bottom thereof with the corresponding correct answer indicating projection code means positioned for reception by corresponding correct answer decoding photosensitive means carried by the teaching machine and training apparatus.

References Cited

UNITED STATES PATENTS

| | | | |
|---|---|---|---|
| 3,137,948 | 6/1964 | Wyckoff | 35—9 |
| 2,323,372 | 7/1943 | Bryce | 88—24 |
| 2,783,454 | 2/1957 | North | 340—149 |
| 3,117,382 | 1/1964 | Schutzberger et al. | 35—9 |
| 3,191,315 | 6/1965 | Hannah | 35—9 |

EUGENE R. CAPOZIO, Primary Examiner

WALTER W. NIELSEN, Assistant Examiner

U.S. Cl. X.R.

35—12